April 5, 1966   F. E. WAHLENMEIER   3,245,074
INDICATOR UNIT FOR QUOTATION BOARD
Filed Aug. 22, 1963   3 Sheets-Sheet 1
FIG. 1
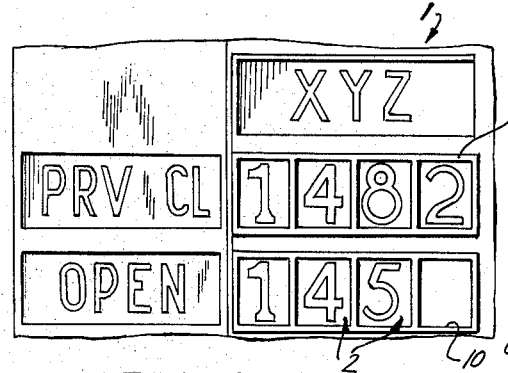
FIG. 2
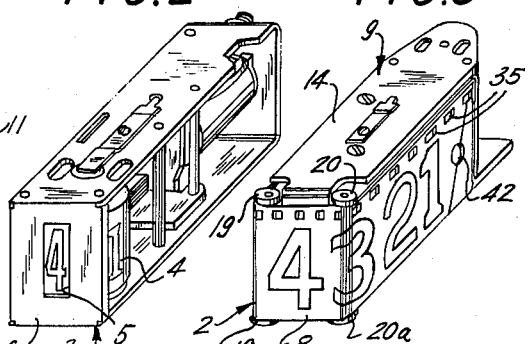
FIG. 3
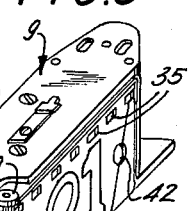
FIG. 4
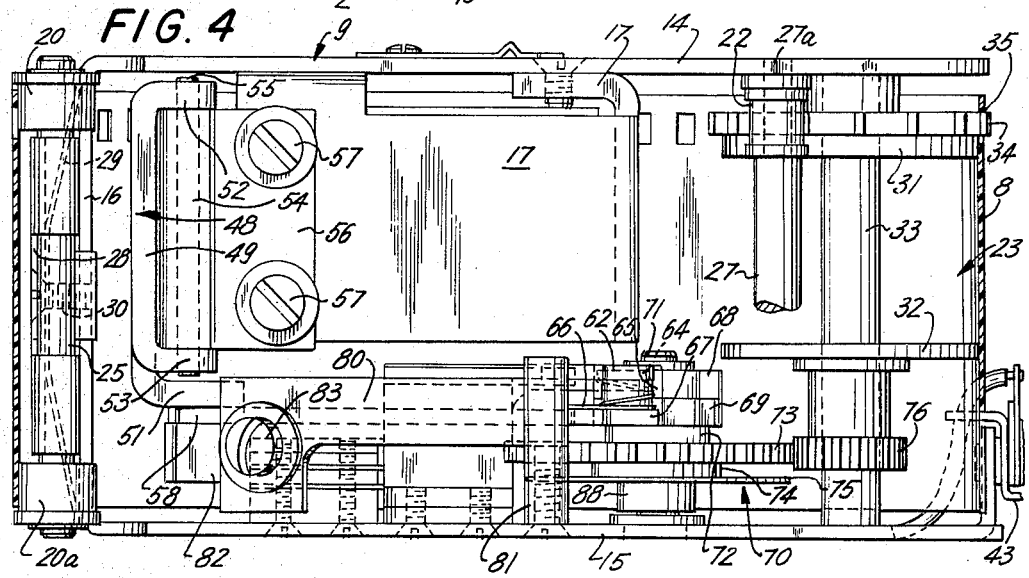
FIG. 10
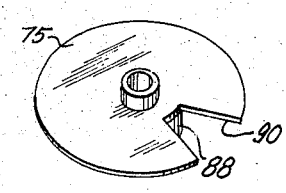
FIG. 11  FIG. 12  FIG. 13
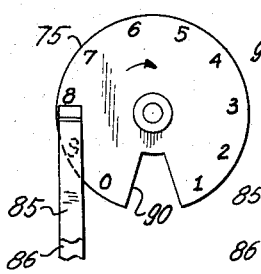 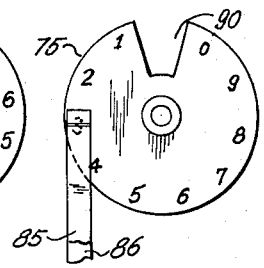
FIG. 14
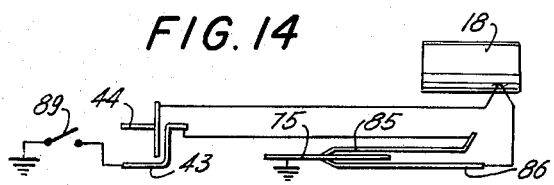
INVENTOR.
FREDERICK E. WAHLENMEIER
BY
Curtis, Morris and Safford
ATTORNEYS

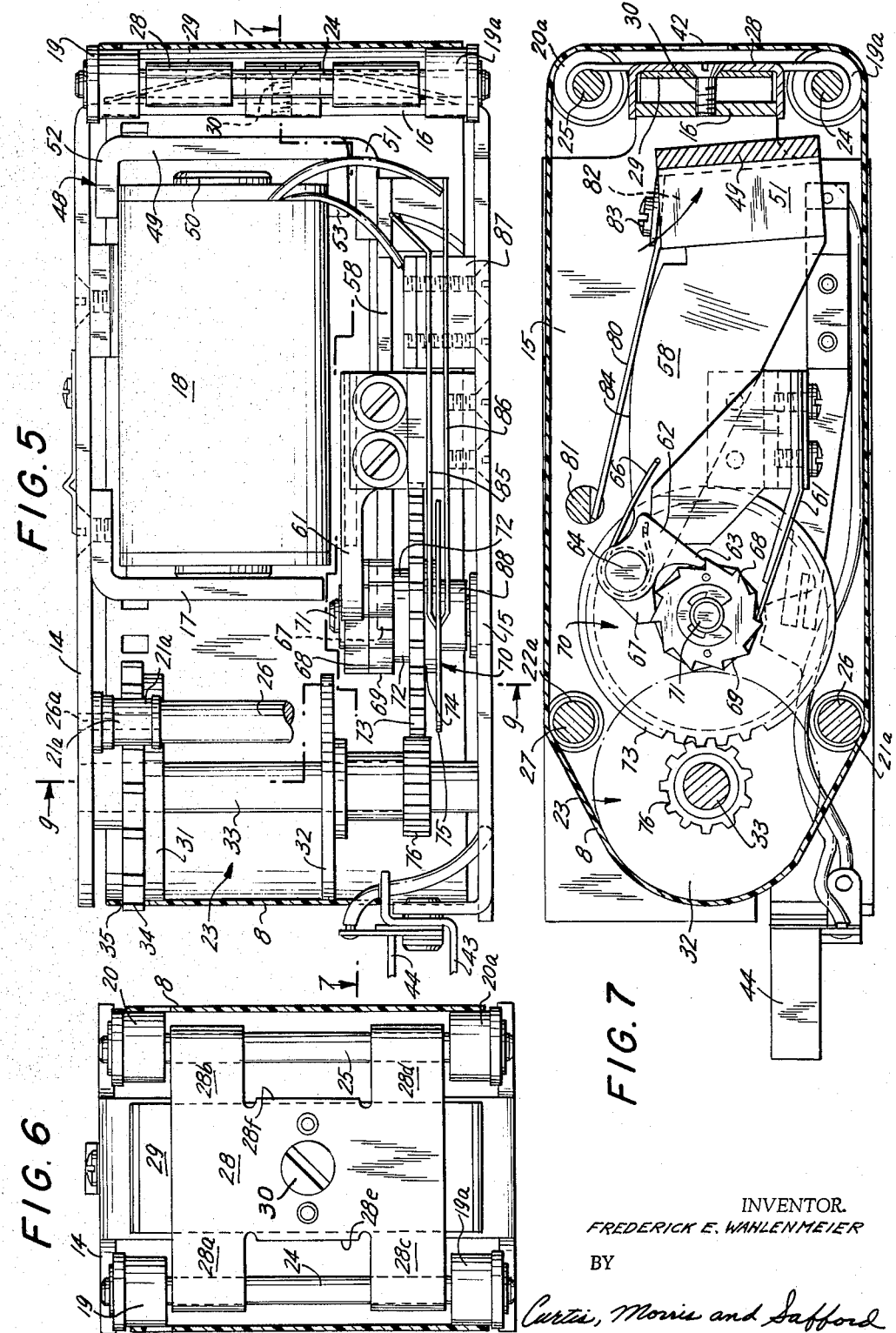

April 5, 1966     F. E. WAHLENMEIER     3,245,074
INDICATOR UNIT FOR QUOTATION BOARD
Filed Aug. 22, 1963     3 Sheets-Sheet 3

INVENTOR.
FREDERICK E. WAHLENMEIER
BY
Curtis, Morris and Safford
ATTORNEYS

United States Patent Office 3,245,074
Patented Apr. 5, 1966

3,245,074
INDICATOR UNIT FOR QUOTATION BOARD
Frederick E. Wahlenmeier, Massapequa, N.Y., assignor to
The Bunker-Ramo Corporation, a corporation of Delaware
Filed Aug. 22, 1963, Ser. No. 303,849
7 Claims. (Cl. 340—379)

The present invention relates to market quotation boards and more particularly to improved indicator units used on such boards to display the digits of a number indicating a particular price.

A considerable number of market quotation boards are in general use having indicator units of the type shown and described in United States Letters Patent to G. L. Bush et al. No. 2,737,650 issued March 6, 1956. These indicator units are mounted on the board by sliding them rearwardly through rectangular openings in the front of the board. Each unit has a pair of contact prongs for engaging contacts in a socket to electrically connect the unit in a circuit. The circuit then supplies electrical impulses or signals for adjusting the unit to indicate any numeral between 1 and 9 and 0. A number of the indicator units, such as four, are arranged in side by side relationship to indicate any number between 1 and 999 as well as tenths of a unit.

The indicator unit of the type illustrated and described in the Bush et al. patent has a display area of 1.1 inches by .4 inch or 0.44 square inch. Thus, the Bush et al. indicator unit provides an aspect ratio of 2.75 or, in other words, the ratio of the longest dimension to the shortest dimension. The optimum aspect ratio of 1 is attained when the character resolved by the human eye is equal in both directions.

One of the objects of the present invention is to provide an improved indicator unit which increases the size and aspect ratio of the numerals indicated in the same display area on the board to make the numerals easier to read at a greater distance.

Another object is to provide an improved indicator unit of the type indicated which is interchangeable on the quotation board with units now in use thereon.

Still another object is to provide an indicator unit of the type indicated which is of relatively simple and compact construction, adapted for economical manufacture and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a side elevational view of a portion of a stock quotation board showing indicator units of the present invention in place thereon;

FIGURE 2 is a perspective view of an indicator unit previously used on the board illustrated in FIGURE 1;

FIGURE 3 is a perspective view of an indicator unit of the present invention and illustrating the continuous belt for displaying numerals and the relative size and aspect ratio of the display area and numerals of the improved unit with respect to the unit illustrated in FIGURE 2;

FIGURE 4 is an enlarged side elevational view of the indicator unit illustrated in FIGURE 3 with the continuous belt shown in section to illustrate the mechanism for mounting and driving the belt;

FIGURE 5 is a side elevational view of the other side of the indicator unit from that illustrated in FIGURE 4 and showing the electric prongs for plugging the unit into the board and commutator disc for controlling the driving mechanism;

FIGURE 6 is an end elevational view of the indicator unit to show the guide pulleys for the continuous belt and movable plate for adjusting the pulleys and tension on the display belt;

FIGURE 7 is a sectional plan view taken on line 7—7 of FIGURE 5 showing the ratchet pawl moved to one extreme position by the spring and the step-up gearing for driving the display belt.

FIGURE 10 is a perspective view of the commutator disc showing the open sector therein;

FIGURE 11 is a plan view of the commutator disc shown divided in eleven sectors with a contact brush engaging one side thereof;

FIGURE 12 is a view similar to FIGURE 1 showing the contact brush overlying the open sector of the commutator disc to engage a corresponding brush at the other side of the disc;

FIGURE 13 is a view similar to FIGURES 11 and 12 showing the commutator moved to a new position to indicate the numeral 3; and FIGURE 14 is a schematic diagram of a wiring arrangement for delivering successive pulses to the coil of the electromagnet.

Figure 8:
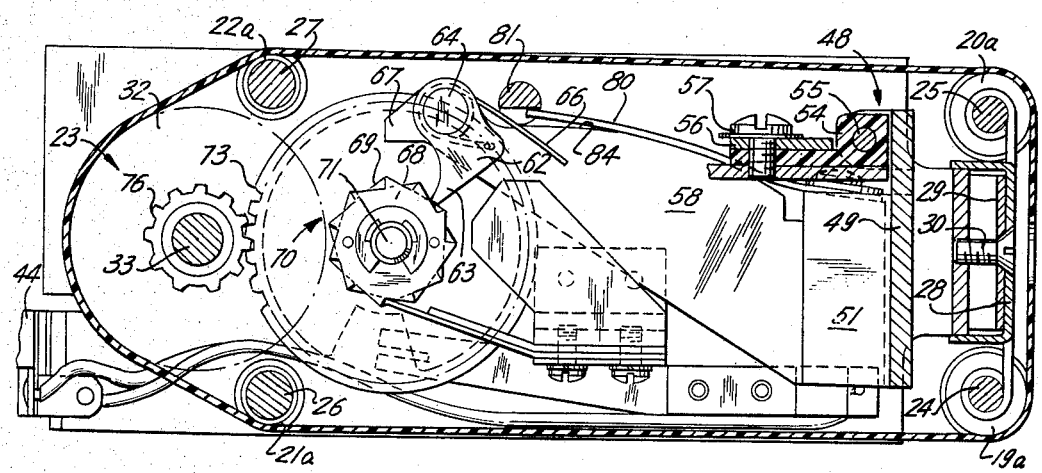
FIGURE 8 is a sectional plan view similar to FIGURE 7 showing the magnet armature and ratchet pawl moved to its other extreme position by the electromagnet.
Figure 9:
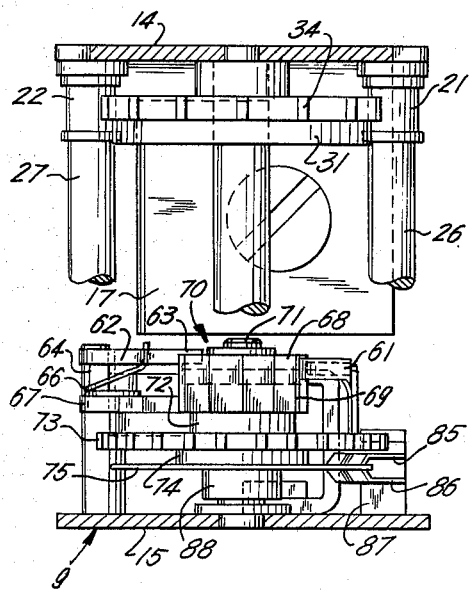
FIGURE 9 is a transverse sectional view taken on line 9—9 of FIGURE 5 to show the mounting of the driving ratchet pawl on the armature arm and the commutator disc operated by the ratchet pawl.

Referring now to the drawings, FIGURE 1 illustrates a portion of a stock quotation board 1 with a plurality of interchangeable indicator units 2 of the present invention mounted in rectangular openings in the front of the board. One of the units 2 is shown enlarged in FIGURE 3. The indicator units 2 of the present invention, as well as being interchangeable with each other, are interchangeable with indicator units 3 previously used in board 1, see FIGURE 2. Thus, the units 2 of the present invention may be used to replace the units 3 on existing boards as well as on new boards to produce a larger numeral in the same space area and having a better aspect ratio so that the numerals may be more easily observed and read.

The unit 3 as illustrated in FIGURE 2 and shown and described in the Bush et al. Patent 2,737,650, referred to above, has the numerals marked on the periphery of a cylindrical drum 4 and the numerals are observed in a window opening 5 in the front wall of the unit frame 6. Thus, the size of the numerals that can be used in a unit 3 is dependent upon the diameter of the cylindrical drum 4 which in turn, is limited by the width of the unit frame 6.

The indicator unit 2 shown in FIGURE 3 of the present invention, on the other hand, has a belt 8 of a thin flexible material, such as "Mylar," with numerals printed thereon. Belt 8 extends around the entire periphery of the frame 9 so as to permit larger numerals to be used both in height and width to produce a better aspect ratio. The frame, however, has the same dimensions as the frame 6 of unit 3 so that it is interchangeable with the unit 3 through the same rectangular opening 10 on the board 1. The belt 8 moves in a path slightly inside the margins of the frame 9 and, due to its length, requires a different driving mechanism that can be used to index the cylindrical drum 4 of the unit 3. A masking frame 11 overlies the front ends of the units 2 and has narrow bars between adjacent units to delineate each numeral from the others of a group.

As shown in FIGURE 4 the frame 9 is of generally U-shaped form having a top plate 14 and bottom plate 15 connected by a front plate 16 and the top plate is of generally rectangular shape but rounded at its rearward end, see FIGURE 3. Attached to and depending from the top plate 14 is a bracket 17 in which an electromagnet coil 18 is mounted, see FIGURE 5, and below the coil is a driving mechanism for advancing the belt 8 as later described in detail. The continuous belt 8 completely surrounds the frame 9, the coil 18 and the driving mechanism, as shown most clearly in FIGURE 3. Belt 8 is mounted on upper and lower pulleys 19, 19a and 20, 20a at the front corners of the frame, in pulleys 21, 21a and 22, 22a at the rear of the rectangular portion of the frame and on a centrally located pulley 23 at the rearward end of the frame below the curved rearward end of the top plate 14. The pulleys 19, 20, 21 and 22, respectively, are mounted to rotate freely on the upper and lower ends of vertical shafts 24, 25, 26 and 27 and each pulley has a flange at its outer edge. The shafts 24 and 25 are carried by a mounting plate 28 having ears 28a, 28b at the top and 28c, 28d at the bottom, see FIGURE 6, which embrace the pins inwardly of the pulleys to mount them in spaced relation. The mounting plate 28 overlies the front plate 16 of the frame 9 and has rearwardly projecting flanges 28e and 28f overlying the sides of the front plate to guide the mounting plate as it moves forwardly and rearwardly. A leaf spring 29 is positioned between the mounting plate 28 and front plate 16 of the frame and is bowed forwardly between its ends to yieldingly press the mounting plate forwardly from the front frame plate 16. A screw 30 extends through a hole in the center of the mounting plate and engaging a tapped hole in the front plate 16 of the frame to adjust the mounting plate forwardly and rearwardly against the action of spring 29 to tension the belt 8 on the pulleys 20 to 23.

The vertical shafts 26 and 27 on which the pulleys 21, 21a and 22, 22a are rotatably mounted are in the form of posts extending between the top and bottom plates 14 and 15 of the frame 9. As shown in FIGURES 4 and 5 the vertical shafts 26 and 27 have reduced ends 26a and 27a extending through the plates 14 and 15 of the frame on which the pulleys rotate and forming annular shoulders for restraining the vertical movement of the pulleys on the shafts.

The centrally located pulley 23 at the rearward end of the frame 9 is formed by spaced discs 31 and 32 mounted fast on a driven shaft 33 journaled for rotation in the top and bottom plates 14 and 15 of the frame 9. The upper disc 31 of the pulley 23 has radially projecting teeth 34 on its periphery which project through perforations 35 in the belt to provide a sprocket wheel for driving the belt. The continuous belt 8 is initially mounted on the frame 9 by turning the screw 30 inwardly into the front plate 16, lowering the belt 8 over the frame until the edges of the belt overlie the upper and lower pulleys 19 to 24 between the flanges and with the teeth 34 on the sprocket disc 31 in alignment with the perforations 35 in the belt. A screw driver is then inserted through a hole 42 in the belt and the screw 30 turned outwardly to permit the leaf spring 29 to press the mounting plate 28 and pulleys 19 and 20 thereon outwardly until the belt is properly tensioned on the pulleys 29 to 23.

The unit 2 has spaced prongs 43 and 44 of an electrical plug projecting rearwardly therefrom for enegaging circuitry for controlling the operation of the unit. Thus, electrical impulses delivered to one of the contact prongs 43 and 44 energizes the electromagnetic coil 18 and mechanism driven thereby to rotate the sprocket disc 31 and advance the belt 8 with a step by step motion to move each successive numeral marked on the belt into view at the front of the board.

In accordance with the present invention the electromagnet coil 18 actuates an armature 48 each time an electrical impulse is received and the armature is connected to operate a driving mechanism with a step by step motion in one direction to step the belt 8 through one increment of movement a distance corresponding to the width of a letter to be displayed.

The armature 48 has pole piece or clapper 49 overlying a pole 50 of the magnet, see FIGURES 4 to 6, and a flange 51 folded at right angles thereto and underlying the bracket 17 and coil 18. The pole piece 49 has spaced ears 52 and 53 at one edge also folded at right angles thereto and overlying the ends of a bearing element 54 of a suitable selflubricating material attached to and projecting forwardly from the edge of the barcket and the armature is pivotally mounted on the bearing element by means of a pivot pin 55 extending through the bearing element and ears 52 and 53 on the armature 48. The bearing element 54, as shown in FIGURE 4, is attached to the bracket 17 by means of a metal plate 56 overlying a rearwardly extending portion and screws 57. Attached to the under side of the right angular flange 51 of the armature 48 is an arm 58, see FIGURE 5, forming a rearward extension of the armature below the bracket 17.

Mounted on the outer or rearward end of the arm 58 of the armature 48 is a ratchet pawl 62, see FIGURES 4 to 9. The ratchet pawl 62 is in the form of a plate having a tongue 63 projecting from one side for engaging successive teeth of a ratchet wheel 68 and the pawl is mounted on a pin 64 projecting from the armature arm 58 with a spacer 65 therebetween. A hairpin spring 66 has one end bearing on the arm 58 and the opposite end bearing against the ratchet pawl 62 to rock it clockwise as viewed in FIGURE 7. A detent spring 61 also engages the teeth of the ratchet wheel 68 at the side opposite pawl 62 to hold the wheel while the latter pawl slips by a tooth thereon during operation of the armature 48 clockwise by magnet 18. The end of the arm 58 of the armature 48 also has a ratchet holding pawl 67 for engaging a ratchet wheel 69.

Ratchet wheels 68 and 69 are part of an assembly 70 of a driving mechanism and the assembly is rotatable on a stub shaft 71 projecting upwardly from the bottom plate 15 of the frame 9. The ratchet wheel 68 engaged by the ratchet pawl 62 has a number of teeth, for example, eleven, greater than the number of characters to be exhibited by the indicator unit 2, for example, ten. The ratchet wheel 69 underlies the ratchet wheel 68 for engagement by the pawl 67 at the end of the armature arm 58 and this ratchet wheel has the same number of teeth as the ratchet wheel 68, but its teeth are inclined in the opposite direction. Below the ratchet 69 is a spacer 72, see FIGURES 4 and 5, and below the spacer is a relatively large driving gear 73 of a step-up gearing train. Another spacer 74 underlies driving gear 73 and below the spacer is a commutator disc 75. The assembly 70 comprising the ratchet wheels 68 and 69, driving gear 73 and commutator disc 75 are connected for rotation as a unit. Driving gear 73 meshes with a smaller pinion gear 76 on the shaft 33 mounting the sprocket disc 31 so as to drive the latter with a considerably greater angular movement than the assembly 70.

The armature 48 is rotated clockwise by the magnet coil 18 from the position illustrated in FIGURE 7 to that illustrated in FIGURE 8 at which time the tongue 63 of the ratchet pawl 62 moves relative to the ratchet wheel 68 to engage another tooth and this movement of the armature is opposed by a spring 80. Spring 80 then rocks the armature 48 and pawl 62 counterclockwise to index the ratchet wheel 68 and assembly 70 a distance of one tooth. During this movement, the pawl 67 at the end of the armature arm 58 engages the next tooth of ratchet wheel 69 to positively limit the movement of the assembly 70 by the ratchet pawl 62 and insure accurate centering of the numeral to be observed.

A novel feature of the present invention in addition to the arrangement for driving the belt 8 comprises the shape of the armature arm 58 and arrangement of the spring 80 to progressively increase the energy stored by the spring as the pole piece 49 of the armature approaches the pole 50 of the magnet and the magnetic force increases. The spring 80 then produces a maximum force at the beginning of the return movement of the armature to initiate movement of the parts of the driving mechanism and produces a minimum force at the end of the movement of the armature. To this end, the leaf type spring 80 is attached to the armature at one end adjacent the pivot pin 55 and its opposite end bears against a post 81 projecting upwardly from the bottom plate 15 of the frame 9. In the illustrated embodiment the end of the leaf spring 80 is attached to a block 82 depending from the flange 51 of the armature 48 adjacent the pivot pin 55 by means of a screw 83, see FIGURE 4. In addition, the edge 84 of the armature extension arm 58 is curved throughout its length, see FIGURES 7 and 8, so that as the armature rocks clockwise the curved edge engages the leaf spring 80 at different locations toward post 81 to progressively shorten the spring and thereby materially increase the energy stored in the spring as the armature 48 moves to its outer position. The spring 80 then delivers maximum power at the beginning of the return stroke of the armature when required to overcome the inertia of the parts of the driving mechanism. At the end of the counterclockwise return movement of the armature 48 the spring 80 applies a minimum force on the armature so as to waste little energy in stopping the parts of the driving mechanism by the engagement of a tooth of the ratchet wheel 69 with the pawl 67.

Still another feature of the improved indicator unit 2 is the commutator disc 75 illustrated in detail in FIGURES 10 to 13. As shown most clearly in FIGURE 5, a pair of brushes 85 and 86 project forwardly from an insulated mounting block 87 to engage the opposite sides of the commutator disc 75. One of the plug-in terminals 43 of the unit 2 is connected to the upper brush 85 while the other terminal 44 is connected to one end of the magnet coil 18. The opposite end of the magnet coil 18, in turn, is connected to the lower brush 86, see FIGURE 14. Any desired circuitry can be provided for controlling the driving mechanism and belt 8 through the commutator disc 75, and by way of example only, a simplified circuit is illustrated diagrammatically in FIGURE 14. In this circuit the lower surface of the commutator disc 75 is connected through the spacer 88, see FIGURE 9, to the lower plate 15 of frame 9, which is grounded. Thus, an electric impulse delivered through the plug terminal 44 is conducted to the magnet coil 18 and the circuit is completed through brush 86 to the lower side of the commutator disc 75 and then to ground. The upper surface of the commutator disc 75 engaged by the brush 85, however, is coated with an insulating material and this brush, as shown in FIGURE 14, is connected through plug terminal 44 to outside circuitry including an open switch 89. As shown in FIGURES 11 to 13 the commutator disc 75 is divided into eleven different sectors, ten of which are marked 1 to 9 and 0 and the other remaining sector is cut out to provide an open notch 90 where the lower brush 86 leaves the disc and grounded connection and engages the upper brush 85 in an open circuit. This position will hereinafter be referred to as the starting or blank position. Thus, by delivering at least eleven impulses, the commutator disc 75 will have been moved so that the brushes 85 and 86 will be positioned in the open notch 90 regardless of the initial position of the commutator. The outside circuitry then connects the upper brush 85 to ground through the switch 89 so that the next impulse supplied to lower brush 86 will complete a circuit to start the driving mechanism in operation and again move the lower brush into engagement with the under side to the commutator disc 75 and ground. Additional impulses operate through the driving means to move the belt 8 to the desired position depending upon the number of impulses delivered to the magnet coil 18. Switch 89 then opens to reset the circuitry for the next change to be made in the number to be displayed by the unit. One form of the invention having now been described in detail, the mode of operation is explained as follows.

For purposes of description, let it be presumed that an indicator unit 3 of the type shown in FIGURE 2 is to be replaced by an improved unit 2 incorporating the novel features of the present invention. To this end the unit 3 is removed from the board 1 by withdrawing it forwardly through the opening 10. Such removal of unit 2 withdraws the plug terminals or prongs 43 and 44 from an electrical socket in the board. The unit 2 is then inserted into the board 1 by pressing it rearwardly through the opening 10 to engage its plug terminals 43 and 44 in the same electrical circuitry as the removed unit 3. A masking frame 11 is then mounted on the board to delineate the units, one from the other, and the numerals on the belt 8 fill substantially the entire area of the opening so that they may be more easily observed and read than the numerals in the replaced unit 3.

Automatic mechanism, not shown, operates through outside circuitry to deliver electric impulses or signals to the unit 2 to operate the driving means therein and change the numeral at the front of the unit in accordance with a change in the price to be quoted. This is accomplished by first delivering at least eleven successive impulses to the plug terminal 44, see FIGURE 14, which is connected to the magnet coil 18 and from the magnet coil to the lower brush 86 and commutator 75 to complete a circuit to ground. Thus, each electrical impulse energizes the magnet coil 18, see FIGURE 5, which, in turn, actuates the armature 48 and acting through the driving mechanism indexes the belt 8 through a distance of one numeral for each impulse until the brushes 85 and 86 overlie the notched opening 90 in commutator disc 75. This positioning of the commutator disc 75 may require one to eleven impulses depending upon the initial position of the disc. After the disc 75 and belt 8 have been moved to a starting or blank position, switch 89 closes, see FIGURE 14, to complete a circuit from lower brush 86 through upper brush 85 to ground and a new series of impulses are delivered to magnet coil 18 corresponding in number to the numeral to be displayed. The armature 48 is actuated, once for each impulse, and operating through the driving mechanism, indexes the belt 8 until the numeral is displayed at the front of the unit 2.

Each impulse energizes magnet 18 and attracts and moves the pole piece or clapper 49 of the armature 48 from the position illustrated in FIGURE 7 to that illustrated in FIGURE 8. During such movement the armature 48 rocks on the pin 55, see FIGURE 4, and moves the armature clockwise. During such movement, the ratchet pawl 62 pivots on the armature arm 58 from the position illustrated in FIGURE 7 to that illustrated in FIGURE 8 to cause the tongue of the pawl to slip by one tooth of the ratchet wheel 68. During such relative movement of the ratchet pawl 62 and wheel 68, the latter is held by the detent spring 61. Upon deenergization of the magnet coil 18 the leaf spring 80 acts on the armature extension arm 58 to rock the latter counterclockwise from the position illustrated in FIGURE 8 to the position illustrated in FIGURE 7 and thereby index the assembly 70 attached to the ratchet wheel through a distance of one tooth. Rotation of the ratchet wheel 68 and assembly 70 is limited by the engagement of the pawl 67 at the end of the armature arm 58 with a tooth of the ratchet wheel 69 inclined in the opposite direction to the teeth of the ratchet wheel 68.

During such clockwise movement of the armature 48, its curved edge 84 engages the spring 80 at successive locations along the spring to, in effect, shorten the spring and progressively increase the energy stored therein as the magnetic force acting on the armature 48 increases. The stored energy in the spring 80 then acts with a maximum force on the arm 58 of the armature 48 to move it and the mechanism driven by the ratchet pawl 62 with a maximum force at the beginning of the return movement and with a minimum force at the end of the return movement.

Rotation of the ratchet wheels 68 by the pawl 62 and spring 80 through an arcuate distance of one tooth rotates the driving gear 73 through the same arcuate distance and acting through the pinion gear 76, rotates the shaft 33 and sprocket disc 31 thereon to move the continuous belt 8. The step-up gearing from the racket wheel 68 to the sprocket disc 31 is so proportioned as to move the belt 8 through one-eleventh of its length. Thus, eleven electrical impulses insures movement of the commutator disc 75 from a position such as that illustrated in FIGURE 11 to that illustrated in FIGURE 12 where the open notch 90 will be positioned between the upper and lower brushes 85 and 86 to open the circuit, see FIGURE 14. When the parts are at the starting position the belt 8 will present a blank area between the numerals 1 and 0 at the front of the unit for observation on the board. A plurality of electrical impulses corresponding to the number to be displayed are then delivered to the magnet coil 18, successively, as previously explained, to index the belt 8 to display the desired numeral. Thus, whenever a new price is to be quoted on the board 1, eleven impulses are first delivered to the magnet coil 18 of each of the units 2 to be changed to move the parts of the units to a common starting position after which a number of impulses are supplied to the magnet coil of the respective units corresponding to the numbers to be displayed.

It will now be observed that the present invention provides an improved indicator unit which increases the size and aspect ratio of the numerals displayed on the board so that the numerals may be read more easily at a greater distance. It will also be observed that the present invention provides an improved indicator unit which is interchangeable with units previously in use on the board. It will still further be observed that the present invention provides an indicator unit which is of simple and compact construction, adapted for economical manufacture and one which is reliable in operation.

While a single embodiment of the invention is herein illustrated and described it will be understood that changes may be made in the construction and arrangement of elements without departing from the spirit or scope of the invention. Therefore, without limitation in this respect, the invention is defined by the following claims.

I claim:

1. An interchangeable indicator unit for data display boards comprising a frame of a shape to fit into a rectangular space in the board, a pair of spaced pulleys at opposite sides of the frame adjacent one end, a driven shaft on said frame, another pulley connected to said driven shaft, a continuous belt mounted on said pulleys to extend around the entire periphery of the frame, said belt being movable across one end of said frame between said pair of spaced pulleys and having indicia marked thereon for observation at said end, all of the elements of said unit being located within the confines of said continuous belt at one side of the frame to adapt the belt to slide onto the pulleys from said side, means for mounting said pair of pulleys on said frame for movement bodily relative to said pulley connected to the driven shaft to permit the belt to slide over said pulleys and then be tensioned into driving engagement with the pulley connected to the driven shaft, a pinion gear on said driven shaft, an electromagnet mounted on said frame, an oscillating armature mounted for movement in one direction by the electromagnet and having a ratchet pawl thereon, a spring acting between said frame and armature to move the latter in the opposite direction, and a step-up gear train between the armature and driven shaft comprising a ratchet wheel actuated by the pawl on the armature and a driving gear connected to the ratchet wheel and meshing with the pinion on the driven shaft whereby successive actuations of the ratchet through a small increment of angular movement corresponding to one tooth moves the driven shaft through a greater angular movement to advance the belt and present successive indicia for observation at the end of the frame.

2. An interchangeable indicator unit for a data display board comprising a frame of a shape to fit into a rectangular space in the board and having a front plate and spaced side plates extending from opposite ends thereof, an adjustable plate mounted on the front plate of the frame, pulleys mounted to rotate on the frame including pulleys at the opposite edges of the adjustable plate, a belt mounted on said pulleys to move across one end of said frame and having indicia marked directly thereon for observation at one end, spring means acting between the front plate of the frame and adjustable plate to tension the belt, means on one of said pulleys providing a driving connection with said belt, a driven shaft mounting said pulley having a driving connection with said belt, means for driving said driven shaft to advance the belt including a ratchet wheel having a plurality of ratchet teeth, an electromagnet having an armature mounting a pawl for actuating the ratchet wheel, one tooth at a time, in the same direction in successive steps as the electromagnet is successively energized, a control disc connected for rotation with the ratchet wheel and having an open notch at one side and extending through an arc corresponding to one tooth of the ratchet wheel, one side of said disc being electrically conductive and the other side of said disc being nonconductive and an electric brush at each side of the disc in contact therewith.

3. An interchangeable indicator unit for a data display board comprising a frame of a shape to fit in a generally rectangular space and having a front plate and spaced side plates extending from opposite ends thereof, an adjustable plate mounted on the front plate of the frame, pulleys mounted to rotate on the frame including pulleys at the opposite edges of the adjustable plate, a belt mounted on said pulleys to extend around the periphery of said frame and having indicia marked directly thereon for observation at one end and perforations adjacent one edge, spring means acting between the front plate of the frame and adjustable plate to tension the belt, one of said pulleys having sprocket teeth projecting therefrom and through the perforations in the belt for driving the belt longitudinally around said end of the frame, a driven shaft mounting said pulley with the sprocket teeth and journaled between the spaced plates of the frame, a pinion gear mounted fast on the driven shaft, an electromagnet mounted on the frame between the side plates and opposite sides of the belt at the end of the frame opposite the pulley having sprocket teeth, an oscillating armature mounted for movement in one direction by the electromagnet and having a ratchet pawl mounted thereon, a spring acting between said frame and armature for moving the latter in the opposite direction, a rotatable assembly mounted on the frame between the pulley with sprocket teeth and electromagnet and comprising a driving gear in mesh with the pinion gear, a ratchet wheel of smaller diameter than the driving gear engaged by the pawl on the armature and a commutator all connected for movement as a unit, and said ratchet wheel and drive gear of the rotatable assembly and driven pinion meshing with the driving gear providing a step-up gear train from the magnetic armature to the continuous belt whereby actuation of the armature through a small increment of movement moves the continuous belt thereon through a much greater increment of movement to present successive indicia for observation at the end of the frame.

4. An interchangeable indicator unit in accordance with claim 3 in which the rotatable assembly includes a second ratchet wheel adjacent the first ratchet wheel, and having teeth inclined in the opposite direction from the teeth on the first mentioned ratchet wheel, a ratchet pawl on the armature in addition to the pawl mounted thereon and engaging the second mentioned ratchet wheel, and a spring detent on the frame engaging the first mentioned ratchet wheel at the side opposite the pawl.

5. An interchangeable indicator unit in accordance with claim 3 in which the ratchet wheel has a number of teeth corresponding to the number of different characters of the indicia to be displayed, a commutator comprising a disc electrically conductive on one side and nonconductive on the other side, a brush on each side of the disc in contact therewith, and said disc having a notch at one edge extending through an arc corresponding to the arc of one tooth of the ratchet wheel where the brushes disengage the disc and contact each other.

6. An interchangeable indicator unit in accordance with claim 3 in which a stub shaft projects from one plate of the frame, and the rotatable assembly being mounted on the stub shaft.

7. An interchangeable indicator unit in accordance with claim 3 in which the magnetic armature is in the form of an arm, the spring for actuating the armature is a leaf spring, and the edge of the armature arm engaging the leaf spring at successive locations as it is rocked by the electromagnet to progressively shorten the spring as the magnetic force of the magnet increases to store energy at a maximum rate and apply a maximum force on the armature at the beginning of its return stroke, and said spring progressively decreasing the force applied to the armature as the latter moves away from the pole of the electromagnet.

References Cited by the Examiner

UNITED STATES PATENTS

| | | | |
|---|---|---|---|
| 1,802,643 | 4/1931 | Floyd | 340—152 X |
| 2,074,066 | 3/1937 | Wheeler et al. | 340—154 X |
| 2,272,242 | 2/1942 | Frischknecht | 340—379 |
| 2,737,650 | 3/1956 | Bush | 340—379 |
| 2,871,467 | 1/1959 | Hailey | 340—324 |
| 3,096,512 | 7/1963 | Hollowich et al. | 340—378 |

NEIL C. READ, *Primary Examiner.*